Patented July 15, 1952

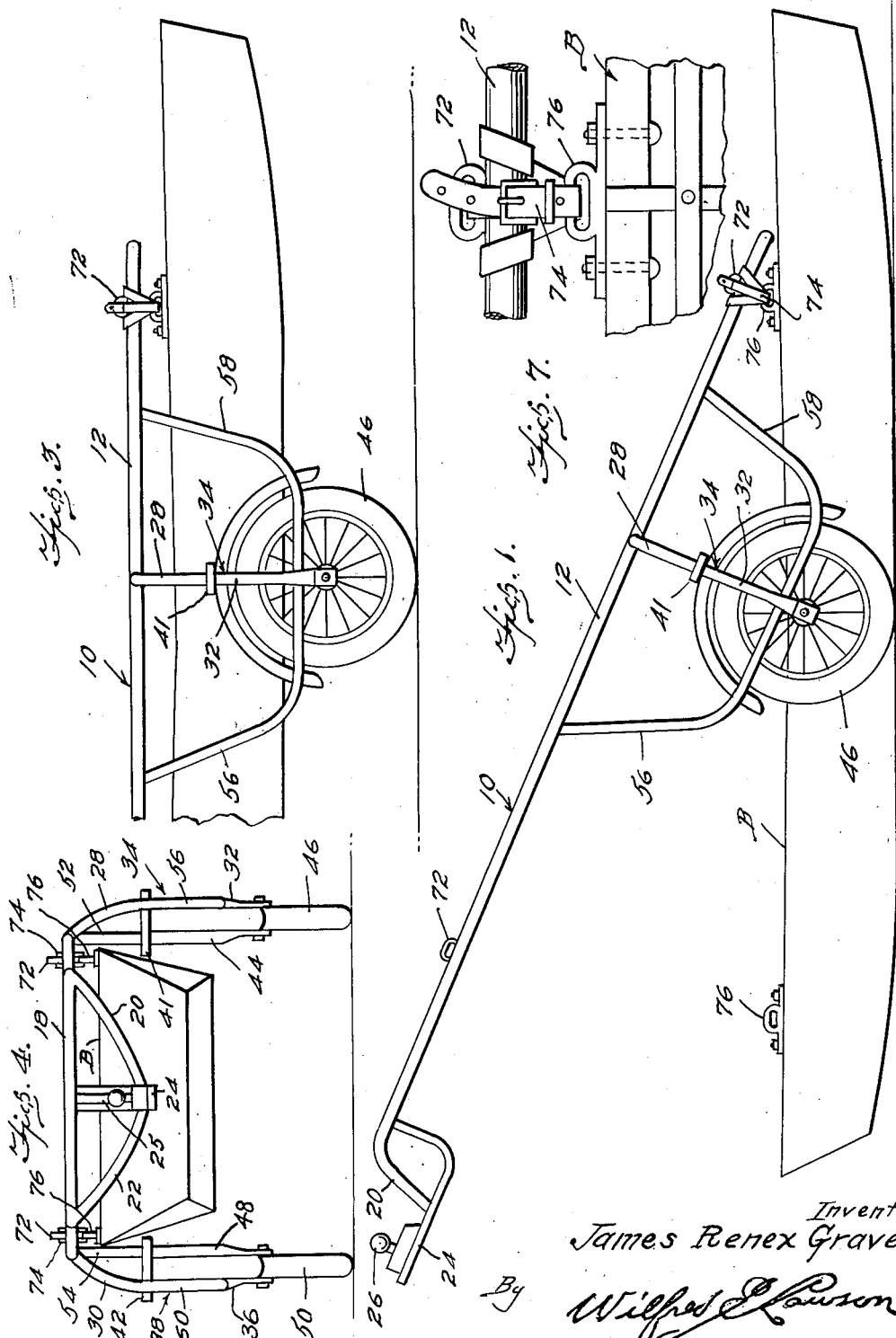

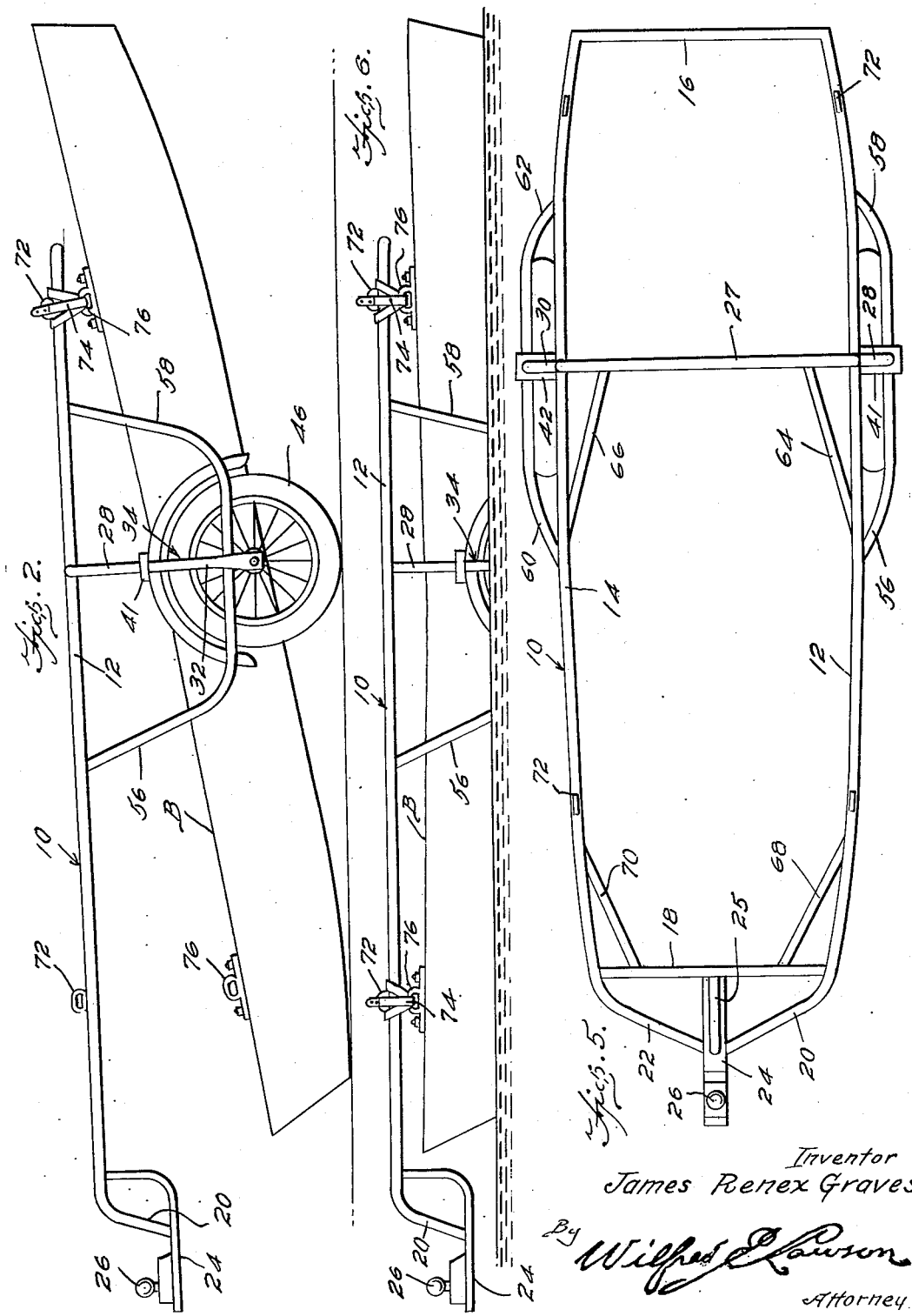

2,603,501

UNITED STATES PATENT OFFICE 2,603,501

BOAT TRAILER

James Renex Graves, Demott, Ark.

Application May 9, 1950, Serial No. 160,982

3 Claims. (Cl. 280—33.4)

This invention relates to a boat trailer and has for its primary object to facilitate the transportation and launching of a boat.

Another object is to avoid the necessity of disconnecting the trailer from the boat during the period that the boat remains in a body of water so that the boat may be easily launched into the body of water or removed therefrom and transported over land.

A further object is to enable the boat to be easily transported over land between bodies of water, and used in a body of water without requiring that the trailer be disconnected from the boat.

Among its features the invention embodies a substantially rectangular frame comprising spaced paralleled side bars to opposite ends of which are fixed spaced parallel end bars, means carried at opposite sides of the frame by the side bars for supporting trailer supporting wheels, means carried by one of the end bars and projecting outwardly therefrom for connection to a traction vehicle, and brace bars extending diagonally between the side bars and the cross bar, and other brace bars extending diagonally between the side bars and the end bar to which the tongue is attached.

Still other features include arched extensions on opposite ends of the cross bar, depending wheel carrying forks on the arched extensions, converging brace bars fixed to the side bars on opposite sides of the cross bar and connected at their convergent ends to the outer legs of the forks and supporting wheels mounted in the forks adjacent the lower ends thereof.

In the drawings:

Figure 1 is a side view of a boat trailer embodying the features of this invention showing it tilted above a boat for connection of the boat carrying straps to the side bars of the trailer adjacent the rear end thereof, Figure 2 is a view similar to Figure 1 showing the trailer tilted forwardly with the stern of the boat elevated ready for attaching the carrying straps at the forward end of the trailer to the boat, Figure 3 is a side view of the boat trailer with the boat suspended therein for transportation over land, Figure 4 is a front view in elevation of the boat trailer and boat as shown in Figure 3, Figure 5 is a top plan view of the boat trailer with the boat removed, Figure 6 is a side view of the boat afloat with the trailer in place thereon, and Figure 7 is a detail view of one of the boat suspending straps.

Referring to the drawings in detail a frame designated generally 10 comprises spaced parallel side bars 12 and 14 held in spaced parallel relation by end bars 16 and 18. Formed at the forward ends of the side bars 12 and 14 are converging extensions 20 and 22 respectively which extend downwardly and outwardly from the forward end of the frame 10. A tongue 24 is fixed at one end to the end bar 18 midway between opposite ends thereof, and this tongue extends downwardly and forwardly beyond the forward ends of the converging extensions and carries at its extreme forward end a suitable coupling 26 by which the trailer may be detachably coupled to a traction vehicle. The converging ends of the extensions 20 and 22 are joined to the tongue 24, and extending upwardly and rearwardly from the junctions of the converging extensions with the tongues is a brace 25 which is fixed to the end bar 18 adjacent the junction of the tongue 24 therewith.

Fixed at opposite ends to the side bars 12 and 14 intermediate the ends thereof is a cross bar 27 carrying at opposite ends arched extensions 28 and 30 which extend downwardly and outwardly from opposite sides of the frame 10 as will be readily understood upon reference to Figure 4. Extending downwardly from the lower end of the arched extension 28 is a leg 32 of a fork designated generally 34, and a similar leg 36 extends downwardly from the outer end of the arched extension 30 and forms a fork 38 on the opposite side of the frame. Extending inwardly from the junction of the arched extension 28 with the leg 32 is a brace member 41 and a similar brace member 42 extends inwardly from the junction of the arched member 30 with the leg 32 of the fork 38. Extending downwardly in spaced parallel relation to the leg 32 from the brace member 41 is a parallel leg 44 which together with the brace 41 and leg 32 form the fork 34 in which a wheel 46 is mounted to rotate. A similar leg 48 extends downwardly from the brace member 42, and together with the brace member 42 and leg 36 form the fork 38. A wheel 50 is mounted for rotation between the legs 36 and 48 of the fork 38 and it will thus be seen that the frame 10 will be supported on the wheels 46 and 50. Extending upwardly from the brace member 41 in alignment with the leg 44 and joining the arched extension 28 intermediate the ends thereof is an upright 52 and a similar upright 54 extends upwardly from the brace member 42 in alignment with leg 48, and joins the arched extension 30 intermediate its ends. It will thus be seen that the downward thrust of the load on the legs 32 and 44 of the fork 34, and the legs 36 and 48 of the fork 38 will be distributed equally on both sides of the wheels 46 and 50. In order to hold the fork member 34 perpendicular to the frame 10 arched converging braced members 56 and 58 are fixed to the side bar 12 in spaced relation to and on opposite sides of the cross bar 27, and lower converging ends join the outer leg 32 of the fork member 34 near the axis of the wheel 46. Similar arched brace members 60 and 62 are connected in spaced relation to the side bar 14 on opposite sides of the cross bar 27, and like the arched braced bars 56 and 58 join at their convergent ends with the outer leg 36 of the fork 38 near the point at which the wheel 50 is mounted. It will thus be seen that the forks 34 and 38 will be held in perpendicular relation to the frame 10.

In order to reinforce the frame I provide brace bars 64 and 66 which extend diagonally between the side bars 12 and 14 and the cross bar 27, on the side of the cross bar adjacent the end bar 18. Similar diagonal brace bars 68 and 70 extend between the side bar 12 and the end bar 18, and the side bar 14 and the end bar 18. In this manner the frame is held at all times in truly rectangular form.

In the preferred form of the invention the side bars 12 and 14 of the frame 10 are equipped adjacent opposite ends with loops 72 for receiving suspension straps 74, and fixed to the gunwale of a boat B in any suitable manner are similar loops 76 through which the suspension straps 74 are looped.

When it is desired to load the boat B on the trailer, the trailer is backed over the boat and tilted substantially as illustrated in Figure 1 so as to enable the suspension straps of the stern of the boat to be passed through the loops 72 and 76. Upon tilting the forward end of the frame 10 downwardly, the stern of the boat will be elevated as suggested in Figure 2 so as to move the suspension straps 74 at the forward end of the frame 10 into close proximity to the loops 76 carried by the boat adjacent the bow thereof. With the suspension straps 74 at the forward end of the frame 10 looped through the loops 76 adjacent the bow of the boat and properly fastened, it is evident that the boat will be suspended from the frame 10 between the wheels 46 and 50 as illustrated in Figure 4, and upon coupling the trailer coupling 26 to a conventional traction vehicle, it is evident that the boat may be transported over land for any desired distance.

Upon reaching the destination, the trailer may be disconnected from the traction vehicle and together with the boat may be launched into a body of water and when the boat is afloat, the trailer will be supported thereby as suggested in Figure 6. Should it be desirable to transport the boat over land for a short distance, as between closely spaced lakes it is only necessary to move the boat to a position near the shore whereupon it may be drawn out of the body of water on the wheels of the trailer and moved over land to the desired location where it can be again launched as previously explained. Owing to the fact that the boat is firmly secured to the trailer by the straps 74, it will be evident that it can be used to transport the boat over land, or when so desired the trailer may be supported by the boat when the latter is afloat and hence is always ready for use.

While in the foregoing there has been shown and described the preferred form of this invention, it is to be understood that minor changes in the details of construction, combination and arrangement of parts may be resorted to without departing from the spirit and scope of the invention as claimed.

I claim:

1. In a boat trailer a substantially rectangular frame having side bars, end bars fixed to said side bars adjacent opposite ends thereof and holding said side bars in spaced parallel relation, converging extensions on the side bars adjacent to one end of the frame, said converging extensions projecting downwardly and forwardly from said frame, a tongue fixed to the end bar adjacent to the end of the trailer from which the converging extensions project, said tongue extending downwardly and forwardly from said end of the frame and having the forwardly extending part fixed to the converging extensions at their junction, a trailer coupling carried by the forwardly extending part of the tongue, a cross bar fixed to the side bars intermediate the ends thereof, said cross bar extending between the side bars, an arched extension on the cross bar at each end thereof, said arched extensions curving outwardly and downwardly from the frame, and a frame supporting wheel carried by each arched extension below the frame.

2. In a boat trailer a substantially rectangular frame having side bars, end bars fixed to said side bars adjacent to opposite ends thereof and holding said side bars in spaced parallel relation, converging extensions on the side bars adjacent to one end of the frame, said converging extensions projecting downwardly and outwardly from said frame, a tongue fixed to the end bar adjacent to the end of the trailer from which the converging extensions project, said tongue extending outwardly and downwardly from said end of the frame and being fixed to the converging extensions at their junctions, a trailer coupling carried by the tongue, a cross bar fixed to the side bars intermediate the ends thereof, said cross bar extending between the side bars, an arched extension on the cross bar at each end thereof, said arched extensions curving outwardly and downwardly from the frame, a frame supporting wheel carried by each arched extension below the frame, and converging wheel braces fixed to the side bars on opposite sides of the cross bar, said wheel braces extending downwardly and outwardly from said side bars and joining the arched extensions adjacent the wheels.

3. In a boat trailer a substantially rectangular frame having side bars, end bars fixed to said side bars adjacent to opposite ends thereof and holding said side bars in spaced parallel relation, converging extensions on the side bars adjacent to one end of the frame, said converging extensions projecting downwardly and outwardly from said frame, a tongue fixed to the end bar adjacent to the end of the trailer from which the converging extensions project, said tongue extending outwardly and downwardly from said end of the frame and being fixed to the converging extensions at their junctions, a trailer coupling carried by the tongue, a cross bar fixed to the side bars intermediate the ends thereof, said cross bar extending between the side bars, an arched extension on the cross bar at each end thereof, said arched extensions curving outwardly and downwardly from the frame, a frame supporting wheel carried by each arched extension below the frame, brace bars fixed to the side bars and to the end bar carrying the tongue, said brace bars extending diagonally between said side bars and said end bar, brace bars fixed to the side bars in advance of the cross bar and extending diagonally inwardly, said last mentioned brace bars being fixed to said cross bar, and converging wheel braces fixed to the side bars on opposite sides of the cross bar, said wheel braces extending outwardly and downwardly from said side bars and being fixed to the outer legs of the forks adjacent the wheels.

JAMES RENEX GRAVES.

REFERENCES CITED

The following references are of record in the file of this patent:

UNITED STATES PATENTS

| Number | Name | Date |
| --- | --- | --- |
| Re. 22,914 | Ballinger | Sept. 16, 1947 |
| 2,448,443 | Krake | Aug. 31, 1948 |
| 2,462,964 | Heggen | Mar. 1, 1949 |